United States Patent [19]
Lange

[11] 3,777,639
[45] Dec. 11, 1973

[54] CAMERA CASING ASSEMBLY

[75] Inventor: Karl Heinz Lange, Ennigloh, Germany

[73] Assignees: Bolda Werka Photographische Gerate; Kunstsloff R. Gruter Kommanditgesellschaft, Westphalia, Germany

[22] Filed: Mar. 9, 1970

[21] Appl. No.: 17,708

[30] Foreign Application Priority Data
Mar. 20, 1969 Germany............... P 19 14 116.3

[52] U.S. Cl................ 95/11 R, 16/180, 24/221 A
[51] Int. Cl.............................................. G03b 17/02
[58] Field of Search....................... 95/11 R, 31, 40; 339/88, 91 R, 147 R; 16/180, 184, 190; 24/221 R, 221 A

[56] References Cited
UNITED STATES PATENTS
| | | | |
|---|---|---|---|
| 1,599,843 | 9/1926 | Schumacher | 16/180 |
| 2,406,026 | 8/1946 | Morehouse | 24/221 A |
| 2,309,737 | 2/1943 | Murphy | 24/221 A |
| 2,148,011 | 2/1939 | Burke | 95/31 X |

FOREIGN PATENTS OR APPLICATIONS
| | | | |
|---|---|---|---|
| 910,337 | 4/1959 | Great Britain | 95/11 R |
| 1,047,996 | 11/1966 | Great Britain | 95/66 |
| 1,280,660 | 10/1968 | Germany | 95/11 |
| 1,060,937 | 3/1967 | Great Britain | 95/31 |
| 480,651 | 1/1952 | Canada | 95/31 |

Primary Examiner—Robert P. Greiner
Attorney—Sparrow and Sparrow

[57] ABSTRACT

A camera in which the parts of the casing are held together through interlocking connections by engagement of catch elements formed on the individual casing parts, eliminating the use of other types of connecting means, such as, screws, rivets, etc. The camera is a so-called "one-way camera" in which the parts after being assembled cannot be taken apart. In case the camera becomes defective, it is discarded. Release of the casing parts is made possible by the use of a special tool.

11 Claims, 8 Drawing Figures

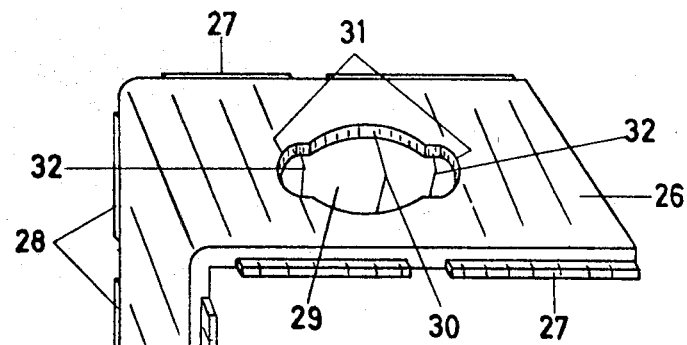
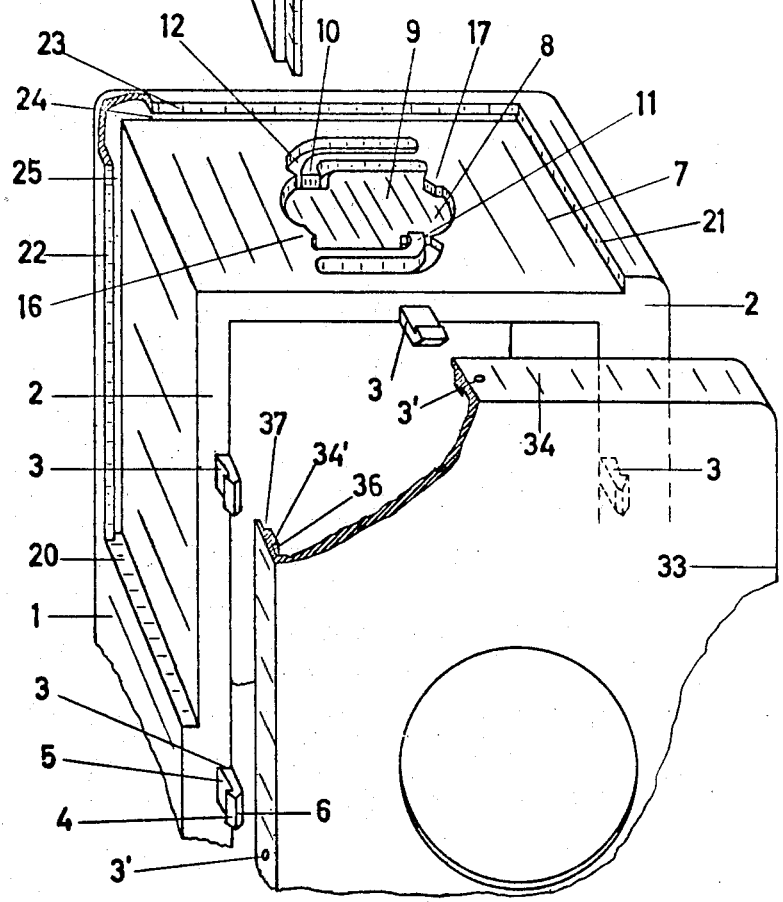
Fig.1

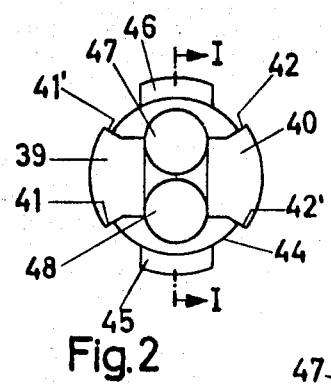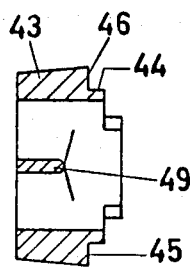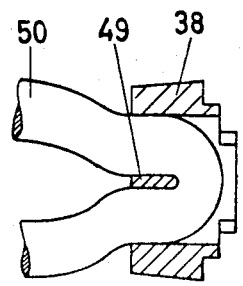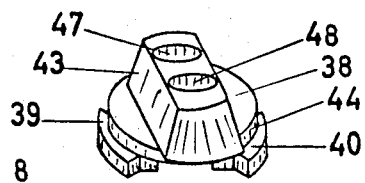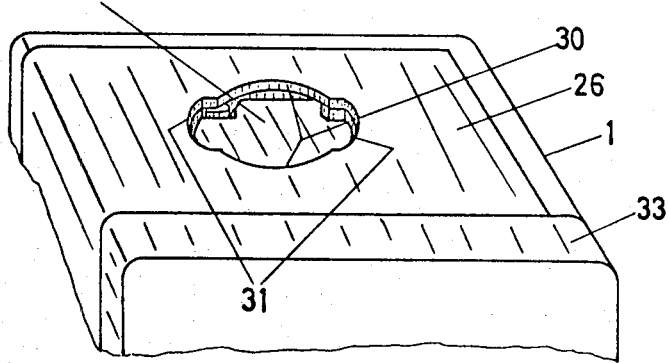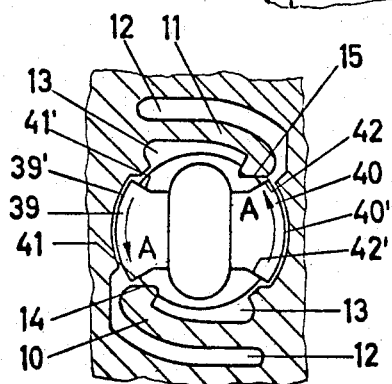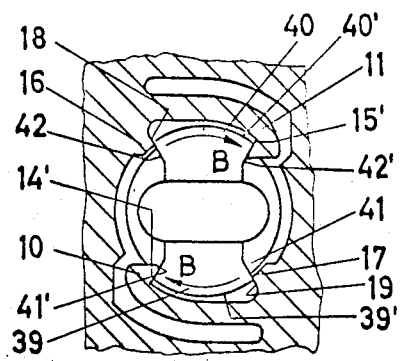

CAMERA CASING ASSEMBLY

BACKGROUND OF THE INVENTION

The present invention relates generally to photographic cameras and particularly to a casing for such a camera which can be easily and simply assembled. It has been customary in the past in the production of camera casings that the individual parts of the casing be secured to one another by welding or by screw connections. Such production is costly because of the expensive equipment and working time required. This production problem is solved by the present invention.

SUMMARY

The invention consists in such novel parts, combination of parts and improvements as may be shown by example in the following description and in the drawing. All parts of the camera casing are held exclusively together by interlocking connections by catch elements attached to or integrally formed on the individual casing parts. The interlocking connections are correspondingly constructed so that the connections of the parts forming the camera casing, for example, the front plate, the camera back, the camera sides, are only releasable by means of a special tool and in no case can be released by the user of such a camera without this tool.

The interlocking connections of the casing parts are preferably produced in a very reliable manner by elastically flexible small hooks or lugs provided on these parts and by the catches cooperating with these small hooks and lugs. The hooks or lugs may also be integrally formed on elastic walls or on plastic portions thereof.

In a special embodiment of the invention the front plate, on which the lens of the camera and the shutter mechanism is fastened, is connected by means of an interlocking connection with the camera casing. The latter consists essentially of the casing sides and of the rear cover, disposed to be swingably opened by a hinge for the insertion of the photographic film, whereas the side of the cover adjacent to the hinge is arranged at an angle relative to the front or rear portion of the cover and which lies on an equally angular rear wall surface when the cover is closed. The gap of the hinge between the camera casing and the swingable rear cover is reduced to a minimum. By the enlarged size of the bevelled contact surfaces of the rear cover, the cover springs freely open by the inherent springiness of the slightly deformed camera side wall upon the release of a rear wall lock. For securing of the front plate a catch lug is arranged on a face of the camera casing toward the front plate or on the side faces of this casing. This catch lug may consist of a shaft disposed perpendicularly to the front face and of a catch tooth integrally formed on the free end of this shaft, which tooth is disposed to co-operate with a front face catch, thus constituting the interlocking connection between the camera casing and the front plate. This catch tooth engages a catch on the front plate, which is formed by a step which runs along the front plate edge on the inside thereof and which is formed in the shape of a trough on the camera casing.

Furthermore there is also a safe inexpensive and easily attachable carrying strap connection which permits also the fastening of the carrying strap nipple which holds the strap, by means of a simple catch. Locking of the inserted carrying strap nipple is performed by a locking arm or locking lug, which constitutes an integral component of this casing similar to the above-mentioned small hooks or other catch elements which are preferably integrally formed on the camera casing. The fastening device for the nipple of the strap is constructed in such manner that a cover plate is arranged in a recess on a side wall of the camera casing, which cover plate has a step, whereby this step is pressed on the cover plate if this consists of sheet metal, but with the cover plate consisting of plastics is preferably integrally molded on this plate. The step projects into undercuts on the inner edge of the recess holding thereby the cover plate firmly on the camera casing. The cover plate has further an opening, which has in a first diametrical axis a smaller guide diameter and has in a second axis preferably perpendicular to the first one, a greater reception diameter. The cover plate is arranged in the recess in the camera casing that it lies eventually with its opening in a cover-like manner on top of a reception opening provided in the area of the recess, whereby this reception opening, which corresponds in the lateral dimension to the greater reception diameter of the cover plate opening, has on the oppositely lying inner edge surfaces four lugs arranged in pairs projecting laterally into the reception opening. These lugs receive wing-shaped locking segments of the nipple of the strap between them, which extend into the area of the reception opening, which lies below the smaller guide diameter of the cover plate opening. At least one of the lugs which project into the reception opening, is constructed in such manner, that upon the introduction or rotation of the locking segments into the area of the reception opening below the smaller guide diameter of the cover plate opening, it can be rotated and after subsequent introduction of the nipple of the strap into the fastening device engages on a locking segment of this nipple.

In a preferred embodiment of the carrying strap connection one lug of each pair of the lugs projecting laterally into the reception opening is of resilient construction, the rigid and resilient lugs on the edge of the reception opening being distributed in such a way that in a peripheral direction a resilient lug follows a rigid lug. The resilient lugs consist of a shaft running along the outer edge of the locking segments and of a catch tooth on the free end of this shaft, projecting into the opening, which catch tooth engages behind a side face of a locking element; whereby the side face runs at an angle of the center of the reception opening serving or acting as a catch surface. The rigid lug associated with the resilient lug is arranged opposite the side face of each locking segment.

Finishing techniques permit the resilient lugs to project into the reception opening, as it will be described in more detail later in an embodiment of the invention, to be produced in a particularly simple manner by recesses in the camera casing, which run along the edge of the reception opening on base or contact surfaces thereof, respectively, and at a distance outside and parallel to the reception opening determined by the width of the shaft of the lugs and are joined together at the free ends of the resilient lugs.

The nipple of the strap itself consists of a small plate shaped as a circular disk, the diameter of which corresponds to the smaller guide diameter of the cover plate and on which are integrally formed on one surface the locking segments and on the other surface a handle with which inserting or turning and removing of the nipple of the strap is performed. This handle consists preferably of a straight piece and is displaced by 90° in relation to the locking segments. It projects beyond the outer edge of the small plate, thus permitting with this handle in the locked condition of the nipple to cover in a simple manner the part of the cover plate opening which is not filled by the circular disk-shaped small plates.

Obviously the opening for the nipple can also serve for receiving an adaptor or a suitably shaped connecting piece for accessories (flash equipment, clamp or table tripod, battery casing etc.), wherein the opening can be provided with electrical contacts, which operate on locking of the accessory device (for example, flash equipment, battery casing), so that it is connected to the current circuit present in the camera. Furthermore a plug shoe or a tripod thread can be integrally formed in the nipple in place of the handle, or it is also possible without further difficulty to provide the accessories with integrally formed locking segments and with a guide plate, so that this permits making a direct connection without an adaptor.

It may be also mentioned that the cover plate can be made in angular form as a cover angle for a better holding of the plate. The recess in the camera casing is constructed in this case, in such manner that it extends from a first camera side face over one edge of the camera casing to the second side face which is perpendicular to this first side face. The cover plate or the cover angle, respectively, has steps on both the camera front and rear, which project on one side into undercuts on the recessed edge of the rear of the camera and on the other side into recesses in the edge of the front plate. The steps also form the edge of the camera front of the recess provided for receiving of the cover angle.

The camera casing is especially adapted for the so-called one-way cameras, which are produced as very cheap cameras and will not be repaired after the parts have been locked in place or if parts of the camera mechanism will fail. This however does not exclude the described camera casing from being used with the same advantages in more expensive camera embodiments, in which opening of the casing is performed by means of special tools in the case of repairs. In this case, the integrally formed steps in the area of the catch connections have interruptions and the spaces are dimensioned in such manners that for the release of these connections special tools with knife-edge projections are introduced into the spaces between the connected parts and are pressed against the catch lugs for unlocking of the catch connections in such manner that these lugs will release the corresponding catch faces.

A further advantageous method for opening of the catch connections consist in providing or forming in the parts of the camera casing which have catch surfaces cooperating with the catch teeth, small more or less capillary openings, through which the catch lugs can be unlocked from the engagement zone of the catch surfaces by needle-like tools.

It may also be further stated that a specially advantageous and cheap construction of the camera or the camera casing, respectively, can be made by making all parts including the integrally formed locking elements of plastics. The present invention will now be described below in more detail with reference to the drawings of one embodiment.

BRIEF DESCRIPTION OF THE DRAWING

In the following description and claims the parts are indicated by reference characters, but these characters are generically used on similar parts as permitted by the state of the art. Similar reference characters characterize like parts in the various figures of the drawing, in which FIG. 1 is an isometric illustration of the camera body with the front plate and a cover angle, FIG. 2 is a view of the underside of the nipple of the strap, FIG. 3 is a section of the nipple of the strap along the line III—III of FIG. 2, FIG. 4 is a section of the nipple of the strap along the line III—III with the carrier strap inserted, FIG. 5 is an isometric exploded view the nipple of the strap and the side face of the camera with the opening for the nipple partly broken away, FIG. 6 is the opening in a partial section of the side face of the camera with inserted nipple in the unlocked position, viewed from the inside of the camera, FIG. 7 is the same view as FIG. 6 but with the nipple in the locked position.

DESCRIPTION OF THE PREFERRED EMBODIMENT

Figure 8:
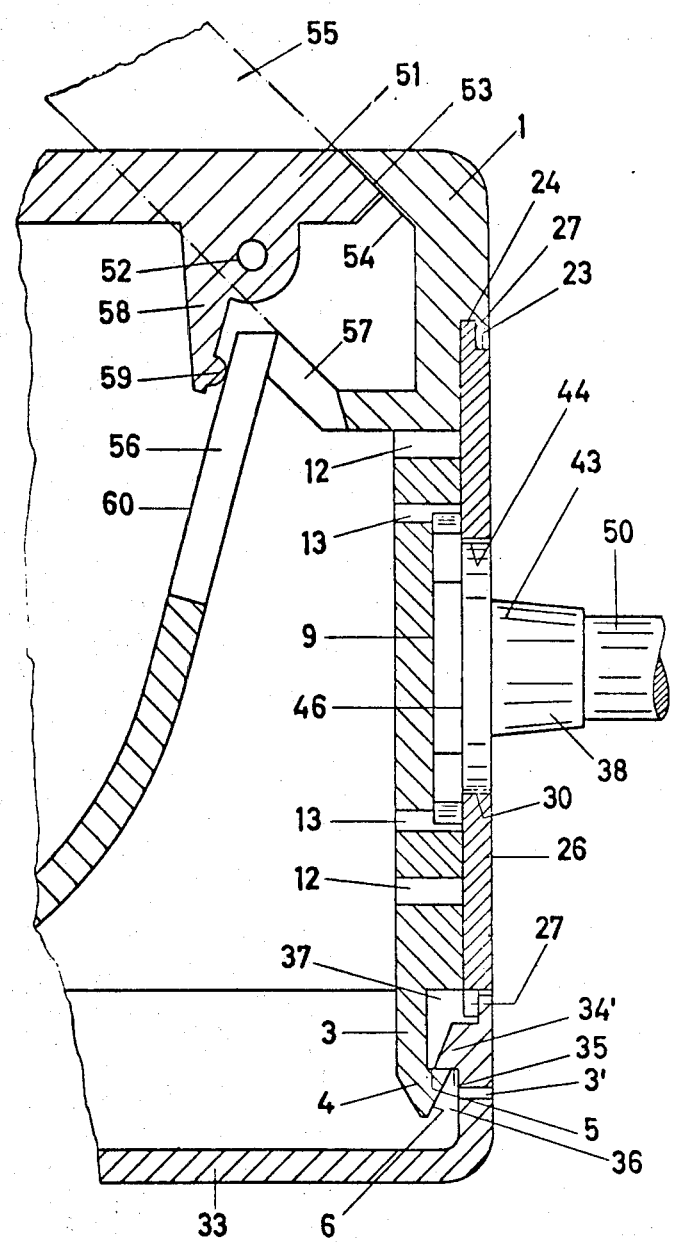
FIG. 8 is a horizontal section of the camera with locked front plate, closed rear wall and locked nipple partly broken away.

FIG. 1 shows the camera casing 1 with several catch lugs 3 integrally formed on the front 2, which lugs have inclined surfaces 4 and 6 and a locking face 5. In the side face of the camera is a recess 7 with the opening 8 for the nipple 38 (FIG. 5) with the sunken contact face 9. Opening 8 has toward the front and the back of the camera the resilient catch arms 10 and 11 which get their resiliency by the cut-outs 12, 13. Furthermore opening 8 has lugs 16, 17 (FIG. 7) arranged opposite to one another with the contact faces 18, 19 thereon. Camera casing 1 has furthermore the cover angle 26 (FIGS. 1, 5 and 8), the recess 7, which is formed by the buffer edge 21 on the camera side face and the abutment edge 20 on the camera upper side and the camera rear edges 22, 23. These camera rear edges 22, 23 have a continuous undercut 24, 25. In FIG. 1 is further seen the cover angle 26 which has the interrupted (or continuous) steps 27, 28 formed on the front and rear, and the opening 29 for the nipple 38. Opening 29 has the smaller guide diameter 30 and the larger receiving diameter 31. The connection between the two diameter sections is made by the surfaces 32. In FIG. 1 is further seen the front plate 33 with the trough-like peripheral edge 34 bent inwardly in the direction to the camera casing. In the center of the inside of this peripheral edge 34, a step 34' is located in the operative zone of the catch lug 3 which forms inwardly of the base of the front plate the recess 36 and on the other side the recess 37.

As FIG. 1 shows, openings 3' are provided on the front plate edge above the engagement position of the catch lug, in which openings needle-like tools can be inserted for opening of the assembled casing, for unlocking of the catch connections by pushing the catch lugs 3 out from the engagement zone of the catch surfaces 35. Such openings 3' are obviously, as it has been explained above, not necessary when for unlocking of the catch connections, the special tools having knife-edge faces are to be used as described above.

FIG. 2 shows the underside of the nipple 38 with the locking segments 39, 40 which have the inclined actuating faces 41, 42, 41'. 42'. Between the handle 43 and locking segments 39, 40 are circular disk-shaped small segments 44 serving as a guide diameter. Handle 43 which is displaced by an angle of 90° relative to the axis of the locking segments projects with the end surfaces 45 and 46 thereof over the circular disk-shaped small segments 44.

In FIG. 3 are the two bores 47, 48 shown in section for threading of the carrier strap 50 therethrough. Between the bores the intermediate wall 49 is left around which the carrier strap 50 is slung (FIG. 4).

FIG. 5 shows nipple 38 in the position for insertion in the reception diameter 31 of cover angle 26 of the camera.

FIG. 8 shows a horizontal partial section of camera casing 1 with the front plate 33 locked in place, the cover angle 26, the assembled rear wall 51 and with locked nipple 38. Rear wall 51 is connected at the pivot point 52 with camera casing 1. The bevelled rear wall surface 53 is dimensioned in such manner that it lies closely on the camera surface 54, with the closed rear wall which is formed by the slide 55 indicated by the dotted line. It is convenient to put the rear wall of the camera under spring pressure, accordingly the rear wall 30 springs back by releasing the locking thereof, in order to facilitate the insertion or removal of the photographic film. This can be attained by different means, i.e., 1. by suitable dimensions of faces 53, 54 so that the same touch one another when the rear wall is not yet completely closed. Thus a stressing of the side wall of the camera will occur in the range of the permissible elastic-deflection which permits the rear wall to spring out upon the release of the locking.

2. by applying one or more contact cams or of a continuous strip on faces 53, or 54 in case the rear wall may not rest on faces 53, 54.

3. by a spring blade 56 in camera casing 1 which results from a U-shaped cutout 57, which with one (or several) small blocks 58 integrally formed on the rear wall cooperates in such manner, that the spring blade 56 is stressed during the last part of the closure path and this stressing is released by the opening. This stressing can be attained by proper dimensioning of parts 56, 58, or by applying of cams 59 on spring blade 56 or on blocks 58, or 4. in which the function of a spring blade is transferred to the integral small blocks 58 by a suitable structure, which is stressed on the camera side wall 60.

Assembling of camera casing 1, cover angle 26 and front plate 33 is performed by cover angle 26 being inserted into the recesses provided therefor on casing 1 (FIG. 1), where it engages with steps 27, 28, beneath undercuts 24, 25 (FIG. 8). Thereafter front plate 33 is pushed to catch lugs 3 on camera casing 1 (FIG. 1) whereby inclined surfaces 4, 6 act in such manner that catch lugs 3 spring back in front of inclined step 34' of the front plate (FIG. 8), until catch lugs 3 can lock in recess 36 and engage with their locking surfaces 5 over locking edge 35 and lock front plate 33. Simultaneously the integrally formed steps 27 of cover angle 26 (FIG. 8) arrive at recess 37 of front plate 33 and prevent cover angle 26 from dropping out.

The method of operation of locking of the nipple of the strap is performed as follows:

Nipple 38 with carrier strap 50 threaded into the same is according to FIG. 5 inserted into opening 8 in such manner, that locking segments 39 and 40 will rest in the reception diameter 31 of cover angle 26, and thus the actuating faces 41, 42 (FIG. 6) of the locking segments are in the position in front of the contact faces 14, 15 of catch arms 10, 11.

Nipple 38 is then rotated in the direction of the arrow A (FIG. 6). Accordingly the points of the actuating faces 41, 42 slide to contact faces 14, 15 of catch lugs 10, 11, which spring back, and then the rotation on the outer diameter 39', 40' of the locking segments 39, 40 is continued until actuating faces 41, 42 come into contact with abutment faces 18, 19 of the limit lugs 16, 17 (FIG. 7), and at the same time catch lugs 10, 11 with their locking faces 14', 15' spring behind actuating faces 41', 42', locking nipple 38. By further continuing this rotation, locking segments 39, 40 leave section 31 of the reception diameter (FIGS. 5, 8) and travel beneath the edge of the guide diameter 30 of cover angle 26, whereby the nipple 38 is secured against withdrawal.

In order to release nipple 38 it is rotated in the direction of the arrow B (FIG. 7). By a torsion movement of predetermined size catch lugs 10, and 11 are pressed against the rounded points of actuating faces 41', 42' and release nipple 38, which is then completely unlocked after a rotation of 90° and can be taken out of opening 8.

Cover angle 26 can be made of plastics or sheet metal with ribs 27, 28 pressed out or otherwise produced along the edges thereof. The cover angle could also be made as a flat plate.

While the invention has been described and illustrated with respect to a certain preferred example which gives satisfactory results, it will be understood by those skilled in the art after understanding the principle of the invention, that various changes and modifications may be made without departing from the spirit and scope of the invention.

What is claimed is:

1. A photographic camera having a casing, said casing comprising a plurality of wall parts connected interlockingly with one another, barb-like catch elements formed on said part, said catch elements being disposed for holding said parts together, said parts being separable manually without the use of tools after being assembled, and a rear cover on the rear side of said casing, said rear cover being openable for inserting and removing film into and out of said casing, respectively, said wall parts comprising elastic walls, catch faces on said walls, said barb-like catch elements consisting substantially of hook-shaped lugs flexibly formed on said walls and said lugs disposed for cooperating with said catch faces, said camera having lens, said parts comprising a front wall and a rear wall, said front wall having an opening for said lens, said casing comprising a hinge, a further one of said parts constituting a rear cover, said rear cover swingably attached to said casing by means of said hinge, said parts further comprising side walls, one of said side walls disposed adjacent said hinge running obliquely relative to said front wall and to said rear wall, and said rear cover having a bevelled face for closing said cover tightly under pressure and imparting a bending stress to said rear wall.

2. A photographic camera according to claim 1, all said parts of said casing consisting exclusively of plastic.

3. A photographic camera according to claim 1, and at least one catch lug on one of said side walls, a catch face on said front wall, said catch lug engaging said catch face, said catch lug comprising a step having an inclined guide face, said step being disposed in a trough-like manner on the inside of said front wall.

4. A photographic camera according to claim 3, and said catch lugs consisting of a shaft disposed perpendicularly with respect to said front wall, and a catch tooth formed on one of the ends of said shaft, said catch tooth having a locking face cooperating with said catch face on said front wall.

5. A photographic camera, having a casing, said casing comprising a plurality of wall parts connected interlockingly with one another, barb-like catch elements formed on said parts, said barb like catch elements being disposed for holding said parts together, said parts being separably manually without the use of tools after being assembled, a rear cover on the rear side of said casing, said rear cover being openable for inserting and removing film into and out of said casing, respectively, said wall parts comprising elastic walls, and catch faces on said walls, said barb-like catch elements comprising substantially hook-shaped lugs flexibly formed on said walls and said lugs disposed for cooperating with said catch faces, carrier strap means, a strap nipple, one of said walls having an opening, locking catch arms integrally formed on said one of said walls of said opening, said strap nipple and said catch arms constituting said carrier strap means, said strap nipple disposed for being locked by said arms in such manner as to be removable by application of a torque moment, connecting means for connecting camera accessories to said camera casing, said connecting means comprising a nipple engaging said accessories, locking catch arms laterally arranged in an opening in one of said walls of said casing, said locking catch arms being integrally fomred with said one wall by recesses in said one wall, said nipple engaging said accessories disposed for being removably locked by said arms, and one of the side wall parts of said plurality of wall parts having a recess, a cover plate fitted in said recess, said cover plate having steps integrally formed thereon, said cover plate being held in said casing by said steps, said cover plate having a first opening for receiving said carrier strap means, said first opening having a first guide diameter and a second, larger guide diameter, said second diameter disposed perpendicularly to said first diameter, said recess having a second opening coinciding with said first opening in said cover plate, and said second opening comprising four lugs arranged in pairs on the inner edge thereof, said pairs of said lugs disposed for locking said strap nipple below said first guide diameter of said first opening of said cover plate.

6. A photographic camera according to claim 5, and wing-shaped locking elements on said strap nipple and a locking segment at said opening, said locking elements disposed for engaging said locking segment in such manner that a reverse rotation of said locking elements is made possible by a predetermined torque moment.

7. A photographic camera according to claim 6, each pair of said lugs comprising one resilient and one rigid lug, said resilient and said rigid lugs projecting into said opening disposed along the periphery of said opening alternating in consecutive order, and each one of said resilient lugs consisting of a shaft arranged along the outer edge of said wing-like locking elements and a catch tooth on one end of said shaft, said tooth adapted to engage behind one of said locking segments while said rigid lugs are in position on the opposite sides of each one of said locking elements.

8. A photographic camera according to claim 7, and said resilient lugs being integrated components of said casing of said camera and recesses formed in said casing concentrically around said opening, the width of said recesses corresponding to the width of said resilient lugs.

9. A photographic camera according to claim 8, and a disk-shaped plate, said wing-shaped lugs formed on said plate, said plate having a diameter corresponding to said first small guide diameter, and a handle formed preferably at right angle to said locking segments on said plate, said handle covering parts of said opening not filled by said plate in the locked position of said carrier strap nipple.

10. A photographic camera according to claim 5, and said cover plate consisting of a flat plate made of metal and recesses formed on said side walls, said recesses having undercuts for receiving said steps.

11. A photographic camera according to claim 5, and said cover plate consisting of plastic, and recesses formed on said side walls, said recesses having undercuts for receiving said steps.

* * * * *

UNITED STATES PATENT OFFICE
CERTIFICATE OF CORRECTION

Patent No. 3,777,639     Dated December 11, 1973

Inventor(s) Karl Heinz LANGE

It is certified that error appears in the above-identified patent and that said Letters Patent are hereby corrected as shown below:

The assignee's name is:

Balda Werke Photographische Geräte und Kunststoff R. Grüter Kommanditgesellschaft Signed and sealed this 23rd day of April 1974.

(SEAL)
Attest:

EDWARD M. FLETCHER, JR.
Attesting Officer

C. MARSHALL DANN
Commissioner of Patents